(12) United States Patent
Wilms

(10) Patent No.: US 8,950,034 B2
(45) Date of Patent: Feb. 10, 2015

(54) CONNECTING DEVICE FOR THE ARTICULATE CONNECTION OF A WIPER ARM TO A WIPER BLADE ACCORDING TO A SIDE-LOCK PRINCIPLE

(75) Inventor: Christian Wilms, Koersel-Beringen (BE)

(73) Assignee: Robert Bosch GmbH, Stuttgart (DE)

( * ) Notice: Subject to any disclaimer, the term of this patent is extended or adjusted under 35 U.S.C. 154(b) by 495 days.

(21) Appl. No.: 13/260,233

(22) PCT Filed: Jan. 28, 2010

(86) PCT No.: PCT/EP2010/050959
§ 371 (c)(1), (2), (4) Date: Dec. 9, 2011

(87) PCT Pub. No.: WO2010/108711
PCT Pub. Date: Sep. 30, 2010

(65) Prior Publication Data
US 2012/0073076 A1    Mar. 29, 2012

(30) Foreign Application Priority Data

Mar. 24, 2009    (DE) .......................... 10 2009 001 809

(51) Int. Cl.
*B60S 1/40*    (2006.01)
*B60S 1/38*    (2006.01)

(52) U.S. Cl.
CPC ................. *B60S 1/40* (2013.01); *B60S 1/3863* (2013.01); *B60S 1/407* (2013.01); *B60S 1/3879* (2013.01)
USPC ................. 15/250.32; 15/250.201; 15/250.43

(58) Field of Classification Search
CPC ...... B60S 1/407; B60S 1/4074; B60S 1/4077; B60S 1/4067
USPC ........... 15/250.32, 250.361, 250.451, 250.44, 15/250.201

See application file for complete search history.

(56) References Cited

U.S. PATENT DOCUMENTS 4,094,038 A * 6/1978 Hancu ......................... 15/250.32
4,300,259 A * 11/1981 Maiocco ..................... 15/250.32
(Continued)

FOREIGN PATENT DOCUMENTS

DE    10000374 A1 *    7/2001    ................ B60S 1/40
DE    10036135 A1 *    2/2002    ................ B60S 1/40
(Continued)

OTHER PUBLICATIONS

PCT/EP2010/050959 International Search Report.

*Primary Examiner* — Monica Carter
*Assistant Examiner* — Andrew A Horton
(74) *Attorney, Agent, or Firm* — Michael Best & Friedrich LLP

(57) ABSTRACT

The invention relates to a connecting device (10) for the articulate connection of a wiper arm to a wiper blade (12) according to a side-lock principle, comprising a connecting element (36) that is fastened to the wiper arm and that runs laterally in relation to a connection element (24) fastened on the wiper blade (12) and that carries a bearing element (34, 38) forming a pivot bearing with a bearing element (34, 38) on the connection element (24), said pivot bearing running transversely to the longitudinal direction of the wiper blade (12), wherein a locking device (40) secures the bearing elements (34, 38) during pivoting into an operational position in the direction of the pivot axis relative to each other. According to the invention, a coding device (46, 52) is provided between the connecting element (36) and the connection element (24) that allows pivoting of the wiper blade (12) into the operational position only if the wiper blade (12) is intended for operation with the associated wiper arm.

16 Claims, 2 Drawing Sheets

(56) References Cited

U.S. PATENT DOCUMENTS

| | | | |
|---|---|---|---|
| 6,594,854 B1 * | 7/2003 | Matsumoto et al. | 15/250.32 |
| 6,634,056 B1 * | 10/2003 | De Block | 15/250.32 |
| 2003/0163885 A1 * | 9/2003 | De Block et al. | 15/250.32 |
| 2005/0251946 A1 * | 11/2005 | Heinrich et al. | 15/250.32 |
| 2006/0117516 A1 * | 6/2006 | Wilms et al. | 15/250.32 |
| 2006/0137126 A1 | 6/2006 | Schauble et al. | |
| 2008/0092320 A1 * | 4/2008 | Cempura et al. | 15/250.201 |
| 2008/0263810 A1 | 10/2008 | De Block et al. | |

FOREIGN PATENT DOCUMENTS

| | | | | |
|---|---|---|---|---|
| DE | 10163221 | | 7/2003 | |
| DE | 10230457 | | 1/2004 | |
| DE | 10330218 | | 1/2005 | |
| DE | 10343571 A1 * | 4/2005 | | B60S 1/40 |
| DE | 102004016017 | | 10/2005 | |
| DE | 102004017941 A1 * | 11/2005 | | B60S 1/40 |
| DE | 102004039527 A1 * | 2/2006 | | B60S 1/40 |
| DE | 102005050569 | | 4/2007 | |
| EP | 1745998 A1 * | 1/2007 | | B60S 1/40 |
| EP | 2108552 A1 * | 10/2009 | | B60S 1/40 |
| FR | 2584036 A1 * | 1/1987 | | B60S 1/40 |
| FR | 2848958 | | 6/2004 | |
| FR | 2902063 A1 * | 12/2007 | | B60S 1/40 |
| FR | 2914603 A1 * | 10/2008 | | B60S 1/40 |
| GB | 1599534 A * | 10/1981 | | B60S 1/40 |
| RU | 2271287 | | 3/2006 | |
| WO | WO 2006000393 A1 * | 1/2006 | | B60S 1/40 |

* cited by examiner

CONNECTING DEVICE FOR THE ARTICULATE CONNECTION OF A WIPER ARM TO A WIPER BLADE ACCORDING TO A SIDE-LOCK PRINCIPLE

BACKGROUND OF THE INVENTION

The invention starts from a connecting device for the articulate connection of a wiper arm to a wiper blade according to a side-lock principle.

DE 102 30 457 A1 has disclosed a connecting device for a wiper arm and a wiper blade, said device having a connection element on the wiper blade and a connecting element on the wiper arm, which are arranged adjacent to one another in the operational position of the wiper blade. The connecting element has a bearing element that interacts with a bearing element of the connection element, connecting the wiper blade to the wiper arm in such a way that it can pivot about an articulation axis transversely to its longitudinal extent. The bearing element on the connecting element is formed by a bearing pin, which engages in a hub of the connection element. The position of the hub relative to the bearing pin in the operational position of the wiper blade is secured by a locking device in the form of a bridge that extends parallel to the bearing pin and fits around the connection element laterally by means of an angled end. At the other end, the bridge is formed integrally on the connecting element.

A similar connecting device is disclosed by DE 10 2005 050 569 A1. Here, the bridge fits over the connection element only partially, with the angled end of the bridge entering a pocket in the connection element, with the result that the angled end is covered from the outside by a side wall of the connection element.

DE 10 2004 016 017 A1 has furthermore disclosed a wiper blade, the connection element of which has, on the front side thereof, a bridge-shaped retention strap, the angled end of which fits partially around a connecting element of the wiper arm and thus secures the position of the bearing pin relative to the hub.

SUMMARY OF THE INVENTION

According to the invention, a coding device is provided between the connecting element and the connection element, allowing the wiper blade to be pivoted into the operational position only if the wiper blade is intended for operation with the associated wiper arm.

The coding device makes it impossible for a wiper blade, which would in principle match a connecting element of a wiper arm by virtue of the nature of its connection element, to be fitted to the wrong vehicle or the wrong side of a vehicle. Vehicles often have different wiper blade lengths on the driver's side and the passenger side. Since the length of the wiper blade on the driver's side is usually longer than that on the passenger side, a wiper blade intended for the driver's side rests solidly on the rubber of the water deflector, the A pillar cover strip, on the passenger side if it is fitted on the passenger side. This leads unavoidably to faults in wiping quality. Such fitting errors can be prevented by means of the connecting device according to the invention.

Since, in the case of a side-lock principle, the locking device frequently takes the form of a bridge or a strap with an angled end that holds the connecting element or the connection element laterally in the operational position, it is expedient to provide the coding device on the locking device. It is expedient if said coding device comprises a coding cam, which is arranged on the connection element or on the connecting element and fits in a corresponding manner into a coding recess in the other part. If the coding cam does not fit into the coding recess, the wiper blade cannot be pivoted into the operational position, resulting in the failure of the fitting operation and prevention of incorrect fitting.

On the one hand, coding for different applications can be accomplished by means of the shape and configuration of the coding cam and of the coding recess and, on the other hand, by means of the position on the connecting element or locking device or on the connection element. Suitable shapes that may be considered are triangular or polygonal recesses and cams or shapes with one or more arcs. The position of the coding device on the connecting element or on the connection element can also be used for coding. The variety of coding options can be further increased through the combination of shape and position. The large number of possible combinations makes it possible to avoid instances of incorrect fitting with certainty even if there is a need to fit a number of window wipers on a vehicle with connecting devices of the same type. The same applies to similar types of vehicle which have different wiper blades with the same connecting devices.

BRIEF DESCRIPTION OF THE DRAWINGS

Further advantages will emerge from the following description of the drawing. The drawing shows illustrative embodiments of the invention. The drawing, the description and the claims contain numerous features in combination. A person skilled in the art will also advantageously consider the features individually and combine them to give worthwhile additional combinations.

In the drawing.

DETAILED DESCRIPTION

Figure 1:
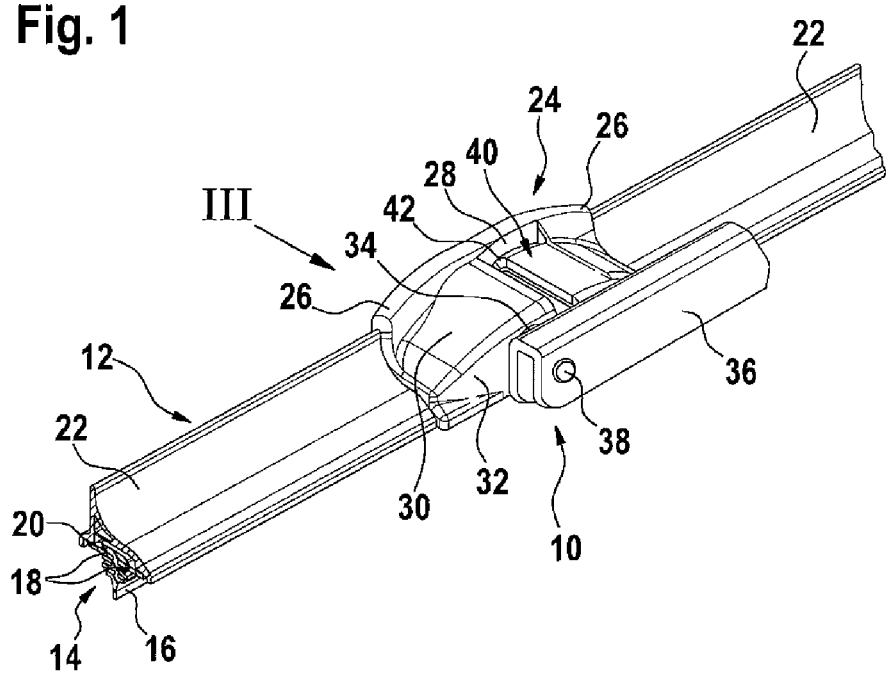
FIG. 1 shows a perspective partial view of a wiper blade with a connecting device according to the invention.

FIG. 1 shows a wiper blade 12 with a connecting device 10. The wiper blade 12 has a wiping strip 14 with a wiping lip 16. The wiping strip 14 is held at the head strip 20 thereof by a flat, prebent supporting element 18 in the form of two parallel spring rails. Spoilers 22 are mounted on those parts of the supporting element 18 which protrude from the head strip 20, extending from the ends of the wiper blade 12 to a connection element 24 of the connecting device 10 in the central area of the wiper blade 12. Connection profiles 26 of the connection element 24 overlap the spoilers 22 for a certain distance in the longitudinal direction of the wiper blade 12. The connection element 24 has a hub 34, which extends transversely to the longitudinal direction of the wiper blade 12 and in which a bearing pin 38 is mounted, the free end of which is secured in a connecting element 36.

The connecting element 36 has a u-shaped profile which is open toward the wiping lip 16 and into the arms 44 of which the bearing pin is inserted. In the assembled state, the connecting element 36 extends at the side of the connection element 24, a locking device 40 being formed integrally on the connecting element 36 on the side facing the connection element 24. The locking device 40 fits over, in the form of a bridge, a top wall 30 of the connection element 24 that connects the two side walls 32 of the connection element 24 to one another and forms a pocket 28 on the side facing away from the connecting element 36. An angled end 42 of the locking device 40 engages in said pocket. The connection element 24 and hence the wiper blade 12 is thus fixed in the direction of the bearing pin 38 between the angled end 42 and an inner arm 44 of the connecting element 36.

Figure 2:
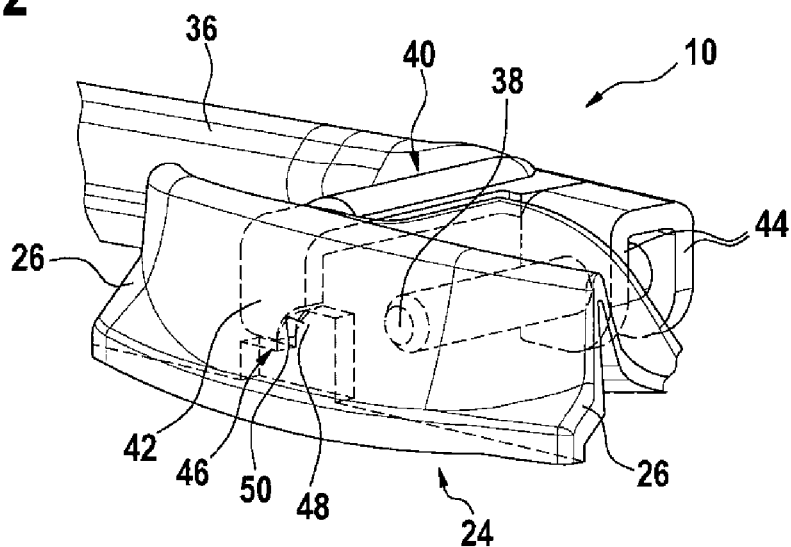
FIG. 2 shows a partially transparent perspective partial view of a first connecting device according to the invention of a wiper blade set.
Figure 3:
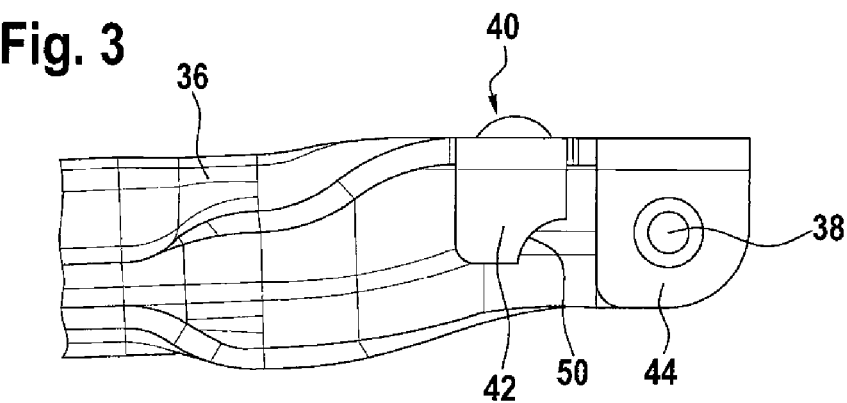
FIG. 3 shows a side view of a connecting element in accordance with FIG. 2 in the direction of arrow III in FIG. 1.

The locking device 40 in accordance with FIG. 2 has a coding device 46. This comprises a coding recess 50 in the form of an arcuate cutout of about 90° formed integrally on the angled end 42 of the locking device 40, into which the correspondingly matching contour of a coding cam 48 fits, which is formed integrally on the connection element 24 in the region of the angled end. In the operational position illustrated, in which the locking device 40 engages in the pocket 28 by means of the angled end 42, the outer contour of the coding cam 48 rests against the inner contour of the coding recess 50. The coding device 46 thus makes it impossible for a connection element that does not match the coding recess 50 to be fitted. As can be seen from FIG. 2 and FIG. 3, the coding recess 50 faces the bearing pin 38.

Figure 4:
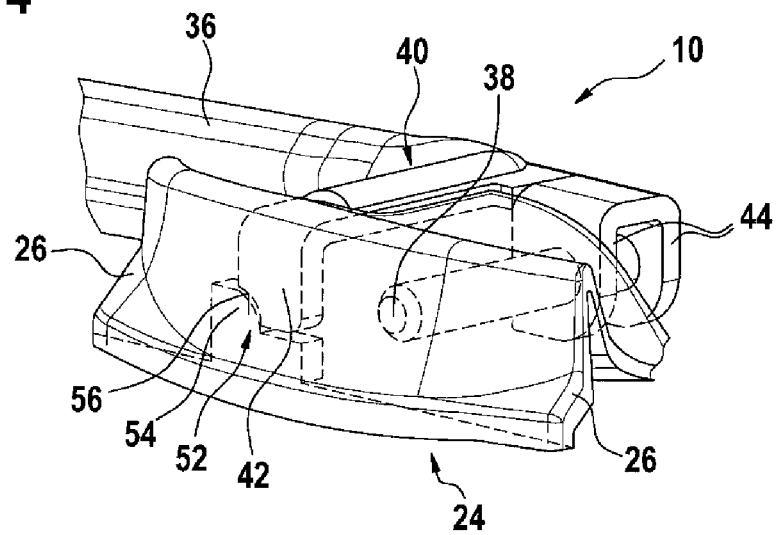
FIG. 4 shows a partially transparent perspective partial view of a second connecting device according to the invention of a wiper blade set.
Figure 5:
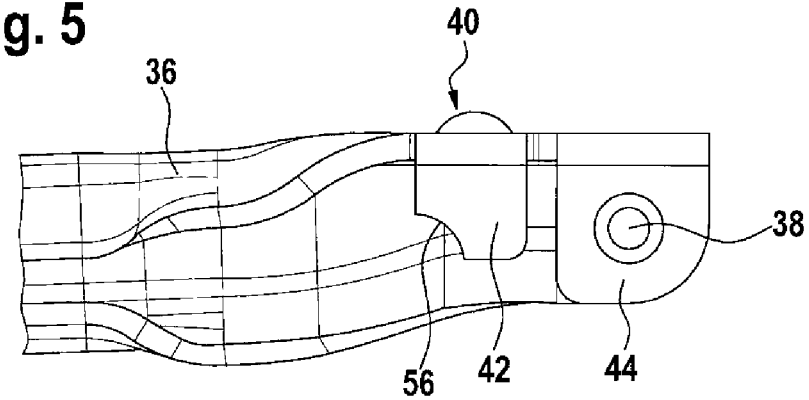
FIG. 5 shows a side view of a connecting element in accordance with FIG. 4 in the direction of arrow III in FIG. 1.

In the embodiment of the connecting device 10 in accordance with FIG. 4 and FIG. 5, a coding recess 56 on the angled end 42 faces toward the opposite side. In corresponding fashion, a coding cam 54 of the coding device 52 is arranged on the connection element 24 in such a way that the convex contour thereof, which fits into the coding recess 56, faces the bearing pin 38. It is easy to see that a wiper blade 12 with a connecting device 10 in accordance with FIG. 2 and FIG. 3 cannot be fitted on a wiper arm with a connecting element 36 in accordance with FIG. 5, since the coding devices 46 and 52 differ in the position of the coding cams 48, 54 and the corresponding coding recesses 50, 56. The coding recesses 46 and 52 can also differ in principle through the shape of their coding cams 48, 54 and their coding recesses 50, 56, e.g. by the coding recesses 50, 56 having different inner contours, which are matched by corresponding outer contours on the contoured cams 48, 54. Suitable shapes that may be considered are triangular or polygonal recesses and cams or shapes with one or more arcs. A large number of possible variations for differentiating different wiper arm and wiper blade combinations without confusion is thus obtained. This is advantageous particularly if different wiper blades are used on the driver's side than on the passenger side on motor vehicles. However, it is also advantageous if the intention is to differentiate window wipers of similar types of motor vehicle from one another.

The embodiments illustrated are shown purely by way of example. With the large variety of different types of connecting devices and locking devices for the side-lock principle, as described summarily at the outset, a person skilled in the art will have numerous opportunities, given a knowledge of the present invention, to find a suitable coding device for the respective connecting device.

What is claimed is:

1. A connecting device (10) for the articulate connection of a wiper arm to a wiper blade (12) according to a side-lock principle, comprising a connecting element (36) that is fastened on the wiper arm and that runs laterally in relation to a connection element (24) fastened on the wiper blade (12) and that carries a bearing element (34, 38) forming a pivot bearing with a bearing element (34, 38) on the connection element (24), said pivot bearing running transversely to a longitudinal direction of the wiper blade (12) and defining a pivot axis, wherein a locking device (40) secures the bearing elements (34, 38) relative to each other in the direction of a pivot axis during pivoting into an operational position, characterized in that the locking device (40) includes a first portion that extends in a first plane parallel to the longitudinal direction of the wiper blade (12) in the operational position, and also includes a second, angled end (42) portion that extends from the first portion in a second plane both parallel to the longitudinal direction of the wiper blade (12) and perpendicular to the pivot axis in the operational position, and further characterized in that a coding device (46, 52) is provided between the connecting element (36) and the connection element (24), allowing the wiper blade (12) to be pivoted into the operational position only if the wiper blade (12) is intended for operation with the associated wiper arm, wherein the coding device comprises a coding cam (48, 54) and a coding recess (50, 56) which fit together and are each arranged separately from one another on at least one of the connection element (24) and the connecting element (36), at least one of the coding cam (48, 54) and the coding recess (50, 56) being disposed on the angled end (42), wherein the coding recess (50, 56) and the coding cam (48, 54) fit together, and wherein the coding recess (50, 56) is arranged on the connecting element (36) and the coding cam (48, 54) is arranged on the connection element (24).

2. The connecting device (10) as claimed in claim 1, characterized in that the locking device (40) is arranged in the form of a bridge or a strap on the connection element (24) and, by means of the angled end (42), holds the connecting element (36) laterally in the operational position.

3. The connecting device (10) as claimed in claim 1, characterized in that the locking device (40) is arranged in the form of a bridge or a strap on the connection element (36) and, by means of the angled end (42), holds the connection element (24) laterally in the operational position.

4. The connecting device (10) as claimed in claim 1, characterized in that the coding of the coding device (46, 52) is determined by the shape or the position of the coding cam (48, 54) and of the coding recess (50, 56).

5. The connecting device (10) as claimed in claim 1, characterized in that the coding of the coding device (46, 52) is determined by the shape and the position of the coding cam (48, 54) and of the coding recess (50, 56).

6. The connecting device (10) as claimed in claim 1, wherein the coding recess (50, 56) and the coding cam (48, 54) are each arranged separately from one another on the connection element (24).

7. The connecting device (10) as claimed in claim 1, wherein the coding recess (50, 56) and the coding cam (48, 54) are each arranged separately from one another on the connecting element (36).

8. A connecting device (10) for the articulate connection of a wiper arm to a wiper blade (12) according to a side-lock principle, comprising a connecting element (36) that is fastened on the wiper arm and that runs laterally in relation to a connection element (24) fastened on the wiper blade (12) and that carries a bearing element (34, 38) forming a pivot bearing with a bearing element (34, 38) on the connection element (24), said pivot bearing running transversely to a longitudinal direction of the wiper blade (12) and defining a pivot axis, wherein a locking device (40) secures the bearing elements (34, 38) relative to each other in the direction of a pivot axis during pivoting into an operational position, characterized in that the locking device (40) includes a first portion that extends in a first plane parallel to the longitudinal direction of the wiper blade (12) in the operational position, and also includes a second, angled end (42) portion that extends from the first portion in a second plane both parallel to the longitudinal direction of the wiper blade (12) and perpendicular to the pivot axis in the operational position, and further characterized in that a coding device (46, 52) is provided between the connecting element (36) and the connection element (24), allowing the wiper blade (12) to be pivoted into the operational position only if the wiper blade (12) is intended for operation with the associated wiper arm, wherein the coding device comprises a coding cam (48, 54) and a coding recess (50, 56) which fit together and are each arranged separately from one another on at least one of the connection element (24) and the connecting element (36), at least one of the coding cam (48, 54) and the coding recess (50, 56) being disposed on the angled end (42), and wherein the coding recess (50, 56) and the coding cam (48, 54) fit together, and wherein the coding recess (50, 56) is on the angled end (42).

9. The connecting device (10) as claimed in claim 8, wherein the coding recess (50, 56) is arranged on the connecting element (36) and the coding cam (48, 54) is arranged on the connection element (24).

10. The connecting device (10) as claimed in claim 8, wherein the coding recess (50, 56) is arranged on the connection element (24) and the coding cam (48, 54) is arranged on the connecting element (36).

11. The connecting device (10) as claimed in claim 8, characterized in that the locking device (40) is arranged in the form of a bridge or a strap on the connection element (24) and, by means of the angled end (42), holds the connecting element (36) laterally in the operational position.

12. The connecting device (10) as claimed in claim 8, characterized in that the locking device (40) is arranged in the form of a bridge or a strap on the connecting element (36) and, by means of the angled end (42), holds the connection element (24) laterally in the operational position.

13. The connecting device (10) as claimed in claim 8, characterized in that the coding of the coding device (46, 52) is determined by the shape or the position of the coding cam (48, 54) and of the coding recess (50, 56).

14. The connecting device (10) as claimed in claim 8, characterized in that the coding of the coding device (46, 52) is determined by the shape and the position of the coding cam (48, 54) and of the coding recess (50, 56).

15. The connecting device (10) as claimed in claim 8, wherein the coding recess (50, 56) and the coding cam (48, 54) are each arranged separately from one another on the connection element (24).

16. The connecting device (10) as claimed in claim 8, wherein the coding recess (50, 56) and the coding cam (48, 54) are each arranged separately from one another on the connecting element (36).

\* \* \* \* \*